Feb. 8, 1927.

R. A. INGHAM 1,616,628

POCKET TIRE TESTER

Filed Sept. 20, 1924

INVENTOR
Robert A. Ingham
BY
Parker W. Page
ATTORNEY

Patented Feb. 8, 1927.

1,616,628

UNITED STATES PATENT OFFICE.

ROBERT A. INGHAM, OF SELLERSVILLE, PENNSYLVANIA, ASSIGNOR TO UNITED STATES GAUGE COMPANY, OF NEW YORK, N. Y., A CORPORATION OF PENNSYLVANIA.

POCKET TIRE TESTER.

Application filed September 20, 1924. Serial No. 738,744.

The invention for which by this application I seek protection by Letters Patent, is an improvement in pocket tire testers. These devices have heretofore been made in the general form of a watch in the casing of which is a Bourdon tube that engages with a pivoted sector in gear with a spindle carrying a pointer that sweeps over a graduated scale to indicate the pressure to which the tube may be subjected.

In certain forms of these tire testers the Bourdon tube is not in direct engagement with the sector, but has a projecting part or end that comes in contact therewith, and being entirely independent of the sector, leaves the latter at the point which indicates the highest pressure so that the device may be detached from the tire valve and the pressure read at convenience. In such cases there must be some resetting means to bring the pointer back to zero after every reading, for which purpose it is customary to provide a pin passing through the side of the case which engages with a projection on the sector and forces the same, when pushed in, back to its normal position.

In any such gage, it is manifestly necessary for correct readings, that the pointer be forced back to the exact zero position; but this cannot be successfully accomplished unless the mechanism is constructed with great nicety and exactness, or the pin be capable of forcing the sector back until the pointer is pressed against the zero stop. The latter provision is almost invariably made.

It has been found, however, that this is open to serious objection, as it inevitably happens that careless usage forces the pointer so hard against the stop as to bend it, the result being the impossibility of securing by its use correct readings without making due allowance for its deformation. The object of my present invention is to obviate this objection.

In general, the gage to which the improvement is applied is or may be of the usual and ordinary type, and comprises a pivoted sector moved by the Bourdon tube that meshes with the spindle carrying a pointer. The sector and pointer are reset to zero or normal position by a spring seated pin, but this element instead of impinging directly upon the sector is adapted to contact with a pivoted plate or part connected with the sector by a spring of such character that when the pointer is brought into contact with the zero stop, the pin may be moved inward still further by the yielding of the spring without imposing upon the pointer a pressure sufficient to bend or injure it.

This arrangement I have illustrated in the accompanying drawing. In this:

Figure 1:
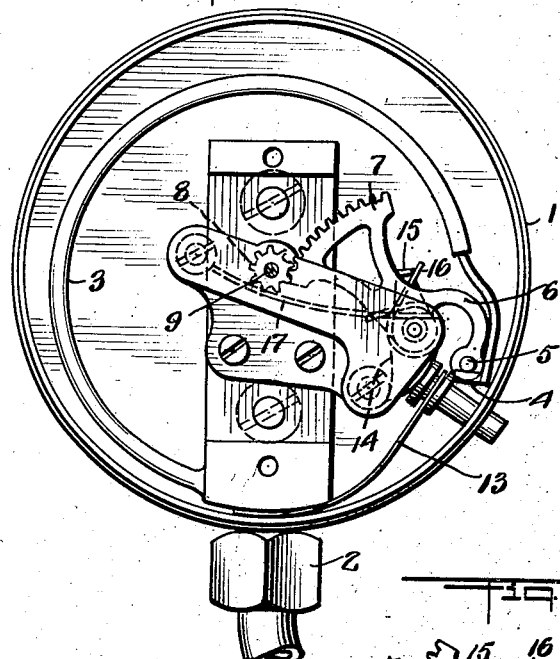
Fig. 1 is a view in elevation of the working part of the gage contained within the case.
Figure 2:
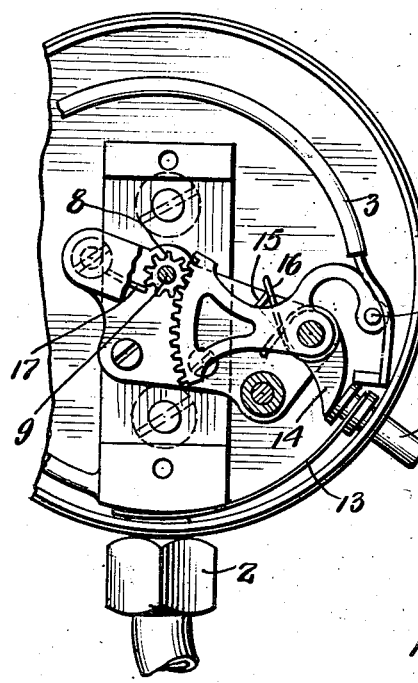
Fig. 2 is a similar view showing the parts in another position.
Figure 3:
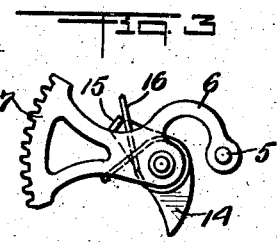
Fig. 3 is a detail of the resetting mechanism.
Figure 4:
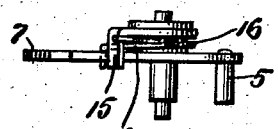
Fig. 4 is a side view of the same.
Figure 5:
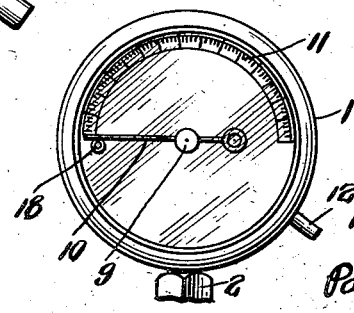
Fig. 5 is a view of the outside of the device, showing the pointer and scale.

The parts are enclosed in a case 1, provided with a means 2, for attaching it to a tire valve. This latter admits air under pressure to a Bourdon tube 3, the end of which has a bent portion 4, that when the tube is subjected to pressure encounters a pin 5, carried by an arm 6, extending from a pivoted sector 7, engaging with a gear 8, on spindle 9, carrying the pointer 10. By these means, which are old in the art, the pointer is moved over the scale 11, to indicate the pressure of the air admitted to the tube 3.

A reset pin 12 passes through the side wall of the case and is held in normal position by a flat spring 13 secured to the inside of the case, and when pushed in to reset it encounters a projecting end 14, of a plate pivoted on the same spindle as the sector. The end of this plate has a projection 15, that engages one side of the sector and a spring wire 16 is bent around the pivot spindle and has one end bent to engage the opposite side of the sector, and the other end bearing against the outer side of the projection 15.

It will be seen that by this means the sector and the plate 14 are connected together so that any movement imparted to the said plate will be transmitted to the sector, provided the latter be relatively free to move. For this purpose the sector is free to move independently except for the pointer spindle with which it engages; but to prevent perfectly free independent movement, a light spring 17 bears upon the spindle carrying the sector and holds the latter in any position to which it may be moved and left.

When the reset pin has been forced in until the pointer has been brought by the sector into contact with the zero pin 18, it may be forced still further without damage by the yielding spring connection between the sector and the plate 14. The force required to do this is not sufficient to bend or injure the pointer.

This improvement while apparently slight, is of great value and importance in devices of this kind and saves the endless amount of trouble and annoyance which has heretofore been encountered in the operation of such tire testers. It avoids extreme care and nicety in the manufacture of the instruments and renders them proof against careless and rough usage.

What I claim as my invention is:

1. In a tire tester the combination with a pointer, means having a definite cooperative relation with said pointer, a pivoted sector engaging said means, and a Bourdon tube for moving the sector, of a pivoted plate member, a spring connection between said plate member and the sector, and a reset pin adapted to impinge upon said member.

2. In a tire tester the combination with a pointer, means having a definite cooperative relation with said pointer, a pivoted sector engaging said means, and a Bourdon tube not connected with but adapted to contact with and move the sector when under pressure, but to leave it at the position to which it is moved on a reduction in pressure, a member pivoted concentrically with the sector, a spring connection between said member and the sector, and a reset pin adapted to impinge upon said member.

3. In a tire tester the combination with a pointer and means for moving the same across a scale into contact with a stop pin, and operated by increased air pressure, of a reset pin for returning the pointer from the position to which it may have been moved by the air pressure, and a yielding connection between the reset pin and the pointer, whereby the reset pin may be moved beyond the point at which it sets the pointer at zero position against the stop pin without causing undue pressure between the pointer and the stop pin.

4. The combination comprising a dial having pressure indications thereon, a pointer adapted to move over said dial, a spindle for said pointer, pressure responsive means, means displaceable by said pressure responsive means to actuate said spindle and said pointer, a member displaceable relative to said means, a reset pin adapted to cooperate with said member, and a spring coacting with said member and said means whereby relative movement of said member and said means is permitted when said member is actuated by said reset pin and said means is held immobile.

5. The combination comprising a dial having a scale thereon, a spindle, a pointer mounted on said spindle, a Bourdon tube, a sector, means on said Bourdon tube for actuating said sector, means for imparting movement to said spindle by said sector, a member movable with said sector, a spring tending to maintain said sector and said member in definite relation to each other, and resetting means adapted to vary the relation of said sector to said member when said sector is held immobile.

6. The combination comprising an indicating pointer, means adapted to assume various and different positions, means for imparting movement of said first named means to said indicating pointer, said means including a sector and a gear, a member movable with said last named means, and a spring tending to urge said member and said last named means into cooperative relation.

7. The combination comprising means adapted to be displaced irregular amounts, means adapted to be positioned by said first named means at any position within the range of movement of said first named means, a member movable with said last named means, a spring forcing said member into cooperative relation with said last named means, and a resetting pin adapted to be actuated to engage and displace said member relative to said last named means and against the force of said spring.

In testimony whereof I hereto affix my signature.

ROBERT A. INGHAM.